(12) United States Patent
Shao et al.

(10) Patent No.: US 11,604,640 B2
(45) Date of Patent: Mar. 14, 2023

(54) CODE REFACTOR RENAMING RECOMMENDER

(71) Applicant: International Business Machines Corporation, Armonk, NY (US)

(72) Inventors: Liujia Shao, Markham (CA); Yan Luo, Concord (CA); Yan Xu, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 17/119,769

(22) Filed: Dec. 11, 2020

(65) Prior Publication Data
US 2022/0188102 A1 Jun. 16, 2022

(51) Int. Cl.
*G06F 8/72* (2018.01)
*G06N 5/04* (2006.01)
*G06N 20/00* (2019.01)
*G06F 8/71* (2018.01)

(52) U.S. Cl.
CPC .............. *G06F 8/72* (2013.01); *G06N 5/04* (2013.01); *G06N 20/00* (2019.01); *G06F 8/71* (2013.01)

(58) Field of Classification Search
CPC .... G06F 8/72; G06F 8/71; G06N 5/04; G06N 20/00; G06N 3/0445; G06N 3/08
See application file for complete search history.

(56) References Cited

U.S. PATENT DOCUMENTS

| | | | |
|---|---|---|---|
| 2019/0228319 A1* | 7/2019 | Gupta | G06N 7/005 |
| 2020/0097261 A1* | 3/2020 | Smith | G06N 3/084 |
| 2020/0175478 A1* | 6/2020 | Lee | G06N 20/00 |
| 2020/0183681 A1* | 6/2020 | Ramsl | G06F 40/30 |
| 2021/0120034 A1* | 4/2021 | Starov | H04L 67/02 |
| 2021/0234930 A1* | 7/2021 | Dinh | H04L 67/51 |
| 2021/0240825 A1* | 8/2021 | Kutt | G06F 8/42 |
| 2021/0240826 A1* | 8/2021 | Kutt | G06V 10/82 |
| 2021/0279235 A1* | 9/2021 | He | G06N 3/0454 |
| 2021/0304055 A1* | 9/2021 | Qi | G06K 9/6256 |

OTHER PUBLICATIONS

Allamanis et al., "Learning Natural Coding Conventions", FSE'14, Nov. 16-21, 2014, pp. 281-293, Hong Kong, China, <http://dx.doi.org/10.1145/2635868.2635883>.

(Continued)

*Primary Examiner* — Daxin Wu
(74) *Attorney, Agent, or Firm* — Nicholas A. Welling

(57) ABSTRACT

An approach to code refactor renaming may be provided. Source code with a naming convention for functions and classes can be presented to a machine learning model. The model may identify the names for functions and classes. The identified names may be tokenized. Docstrings associated with functions and classes may be identified. Code for the identified functions and classes and associated may be input into a feature vector generation mechanism. A model may be trained mapping the generated feature vectors to tokenized identified names, via regression. The model can be utilized to analyze input code with the same naming convention to predict names for functions and classes, allowing for the recommendation of function and class names in accordance with the programming code naming convention.

20 Claims, 6 Drawing Sheets

(56) References Cited

OTHER PUBLICATIONS

Allamanis et al., "Suggesting Accurate Method and Class Names", ESEC/FSE'15, Aug. 30-Sep. 4, 2015, pp. 38-49, Bergamo, Italy, <https://dx.doi.org/10.1145/2786805.2786849>.

Arnaoudova et al., "REPENT: Analyzing the Nature of Identifier Renamings", IEEE Transactions on Software Engineering, 2013, DOI 10.1109/TSE.2014.2312942, pp. 1-37, <http://www.IEEE.org/publications_standards/publications/rights/index.html>.

Liu et al., "Learning to Spot and Refactor Inconsistent Method Names", 2019 IEEE/ACM 41st International Conference on Software Engineering (ICSE), 2019, DOI 10.1109/ICSE.2019.00019, pp. 1-12.

Mell et al., "The NIST Definition of Cloud Computing", Recommendations of the National Institute of Standards and Technology, Special Publication 800-145, Sep. 2011, 7 pages.

\* cited by examiner

US 11,604,640 B2

CODE REFACTOR RENAMING RECOMMENDER

BACKGROUND OF THE INVENTION

The present invention relates generally to the field of renaming objects in programming code, more specifically, training and applying a machine learning model to analyze code and doc strings to recommend names for functions or class names within programming code.

Reviewing code in modern software development is a large portion of developing new programs. Often the individual who wrote the code is not the one that is performing the code review. Programming naming conventions are often required to follow business or organizational guidelines. Proper class and function names are vital to ensuring the efficient code review. The correct naming convention of functions and classes within docstrings code make the job of reviewing code quicker and more cost effective, especially when the individual that wrote the code is not performing the review.

SUMMARY

Embodiments of the present disclosure include a computer-implemented method, computer program product, and a system for code refactor renaming. Embodiments can include receiving a source code dataset, wherein the dataset is comprised of a plurality of functions and a plurality of classes. Additionally, embodiments may include identifying function names and class names from the plurality of functions and the plurality of classes of the source code dataset. Further, embodiments may include tokenizing each of the identified function names and identified class names. Included in embodiments, generating feature vectors for the source code of the plurality of functions and the plurality of classes. Generating feature vectors for the docstrings associated with the plurality of functions and the plurality of classes can be included in embodiments. Further still, combining each feature vector of the docstrings with the corresponding feature vector of the source code in the at least one of the functions and the class can be included in embodiments. The embodiments, may include, training a machine learning model through regression to map the combined feature vectors to the corresponding tokenized function names. Additionally, receiving a programming code with the same naming convention as the determined naming convention at the trained machine learning model. With embodiments that include generating a name recommendation for one or more functions with the trained machine learning model.

The above summary is not intended to describe each illustrated embodiment of every implementation of the present disclosure.

Figure 1:
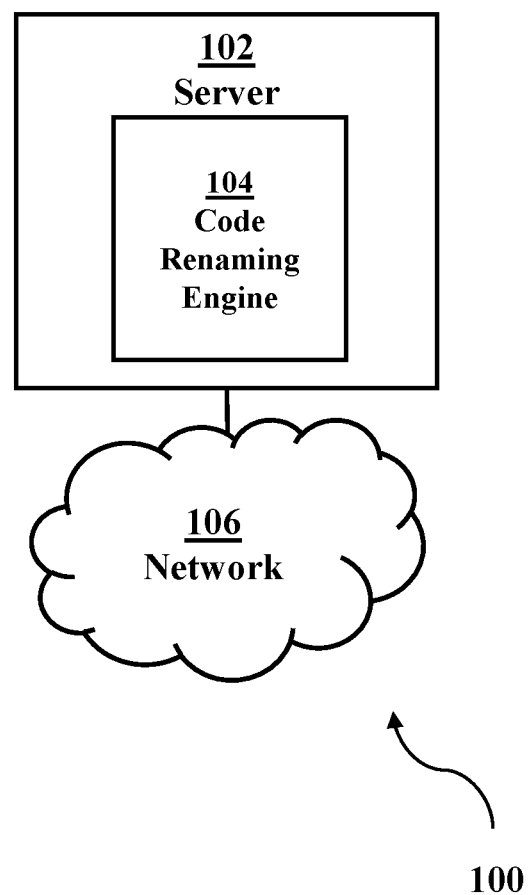
FIG. 1 is a functional block diagram generally a code refactor renaming environment, in accordance with an embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The embodiments depicted allow for an approach for generating a code refactor renaming recommendation. A good deal of time and resources are dedicated to reviewing and renaming code in computer program development. In many cases the individual that is reviewing the code is not the one that wrote it, as a fresh set of eyes is helpful in finding errors. However, this can lead to confusion as the reviewer may not always understand the naming conventions of the code writer.

Provided in this description is an approach for training and utilizing a code refactor renaming model. In an embodiment, the naming convention for a source code dataset in a given programming language may be determined. The names of functions and classes may be identified. The names of functions and classes can be tokenized by a tokenization model. Further, feature vectors can be generated via an encoding model. A naming prediction model can be trained through regression by mapping the generated feature vectors to the tokenized names of functions and classes. Additionally, a code requiring review with the same naming convention as the source code can be provided to the model and the model be applied to the unreviewed code to generate a recommendation for the renaming the portion of code.

FIG. 1 is a functional block diagram depicting a code refactor renaming environment 100. Code refactor renaming environment 100 comprises code renaming engine 104 operational on server 102 and network 106.

Server 102 can be a standalone computing device, a management server, a web server, a mobile computing device, or any other electronic device or computing system capable of receiving, sending, and processing data. In other embodiments, server 102 can represent a server computing system utilizing multiple computers as a server system. In another embodiment, server 102 can be a laptop computer, a tablet computer, a netbook computer, a personal computer, a desktop computer, or any programmable electronic device capable of communicating with other computing devices (not shown) within code refactor renaming environment 100 via network 106.

In another embodiment, server 102 represents a computing system utilizing clustered computers and components (e.g., database server computers, application server computers, etc.) that can act as a single pool of seamless resources when accessed within code refactor renaming environment 100. Server 102 can include internal and external hardware components, as depicted and described in further detail with respect to FIG. 4. It should be noted, while only server 102 is shown in FIG. 1, multiple computing devices can be present within code refactor renaming environment 100. For example, a client computer (not shown) may be in communication with server 102 via network 106. In another example, server 102 can be a part of a cloud server network in which a computing device (not shown) connected to network 106 can access server 102 (e.g. the internet).

Code renaming engine 104 can be a computer module capable receiving programming code and generating naming recommendations for a programming code. In some embodiments, code renaming engine 104 can identify the naming convention of an input programming code data source. Additionally, code renaming engine 104 can tokenize identified functions and classes within the programming code of a naming convention. For simplicity, functions and classes will be referred to as renaming articles, as the final output of the described approach is to recommend a name for functions and classes of the input programming code if a more appropriate name is detected by the model. Further, code renaming engine 104 can generate feature vectors of renaming articles (described further below.) It should be noted, while in FIG. 1 code renaming engine 104 is shown operational on server 102, it may be operational on multiple computing devices (not shown) within code refactor renaming environment 100, via network 106. Additionally, in some embodiments, a user may access code renaming engine 104 from a client computer in communication with server 102 (not shown), via a user interface configured to receive an input programming code.

Network 106 can be a local area network (LAN), a wide area network (WAN) such as the Internet, or a combination of the two, and can include wired, wireless, or fiber optic connections. In general, network 106 can be any combination of connections and protocols that will support communications between server 102 and other computing devices (not shown).

Figure 2:
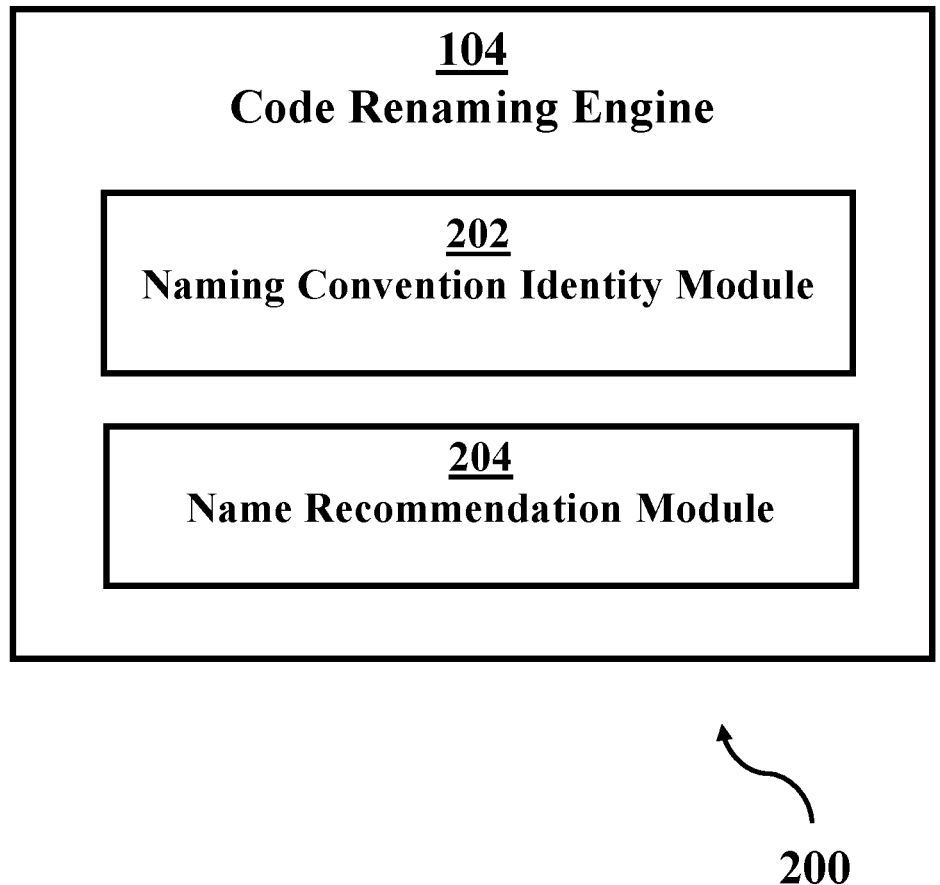
FIG. 2 is a functional block diagram depicting a code renaming engine, in accordance with an embodiment of the present invention.

FIG. 2 is functional block diagram 200 of code renaming engine 104. Operational on code renaming engine 104 can be naming convention identity module 202 and name recommendation module 204.

Naming convention identity module 202 is a computer module that can be configured to receive an input programming code with a naming convention and identify naming articles within the input programming code. The programming code can be any object oriented programming code (e.g., Python, C++, Java, JavaScript, Ruby, etc.). Naming convention identity module 202 may be comprised of a programming interpreter or language parser, for example, an abstract syntax tree analyzer. The abstract syntax tree analyzer can be a preconfigured analyzer or user developed. An abstract syntax tree analyzer can perform a lexical analysis of the code and followed by a syntactic analysis of the code based on the lexical analysis. From the syntactic analysis the structure of the code can be compiled. For example, a function may be nested within another function. The nested function would be shown lower in the overall structure of the tree. Further, classes can be identified based on the identification of variables within the code. Additionally, naming convention identity module 202 can identify docstrings based on their exclusion from the abstract syntax tree or language parser.

In some embodiments, naming convention identity module 202 can tokenize the input programming code. The naming convention identity module 202 can be configured to tokenize naming articles. For example, a function named: read_file(file_name) may be tokenized to the following [Read, File]. In some embodiments, naming convention identity module 202 can be a regular expression generator or an n-gram generator. An n-gram generator can generate a token that is "n" (uni, bi, tri, etc.) words long. In the immediate example above, the n-gram generator would be a bi-gram generator. However, "n" can be variable depending on the number of words detected by the language parser within the name of the naming article. Further, a variable n-gram generator can be configured to generate tokens up to a certain number (e.g., 1 to 5).

Name recommendation module 204 is a computer module that can receive generated tokens and identified docstrings and code from naming convention identity module 202. Further, name recommendation module 204 can generate a name recommendation for a naming article if it detects a name that is more closely aligned to previously analyzed programming code with the same naming convention. In some embodiments, name recommendation module 204 can receive the identified programming code and docstrings. Further, name recommendation module 204 can be a machine learning model configured to generate feature vectors for the received code and docstrings. In some embodiments, name recommendation module can be comprised of an encoder. An encoder can be a neural network (e.g., recurrent neural network, convolutional neural network, etc.) configured to generate feature vectors. In some embodiments, the encoder can be a word embedding model (word2vec, continuous bag of words, skip-gram). In some embodiments, name recommendation module can be two encoders. One encoder can be configured for identified code (e.g. a code encoder), the other encoder can be configured for docstrings (a sentence encoder). For example, the docstring "read file content" would be fed into the sentence encoder, while the associated code "with open (file_name, 'r') as f: return f.readLines( )" would be fed into the code encoder. In some embodiments, the encoder can have a final layer comprising of a SoftMax function.

Upon generation of feature vectors for code and doc strings in separate encoders, some embodiments of the invention name recommendation module 204 can combine the feature vectors from the two encoders for associated docstrings and code. Combining the feature vectors can be taking the average between the two.

In some embodiments, name recommendation module can be a sequence-to-sequence model configured to map the combined feature vectors generated by naming convention module 202 to the corresponding tokens generated by naming convention identity module 202. In some embodiments, a decoder can be configured to predict the tokens. For example, when training the model, the encoder can be updated via regression when a token is incorrectly predicted, until a minimum loss function has been determined (e.g. cross-entropy loss).

In some embodiments, name recommendation module 204 can present a name recommendation to a user based on the output of the recommendation model. For example, the recommended name of the naming article can be presented in a user interface window next to the current name for the naming article. Additionally, name recommendation module 204 may check the generated name recommendation against the current names of the naming article and only present the predicted names which are different. For example, if an input code has a function name of "flip switch," while the predicted name of the function is "turn knob," and all other naming articles matched the predicted name, the predicted name for "flip switch" would be presented, with the pertinent information. Further, the user's selection can be user to further update the model for the trained naming convention. Additionally, in some embodiments of the invention a confidence score for the prediction can be presented to a user. In some embodiments, name recommendation module can automatically change the name of the naming article to the predicted output if the confidence score is above a predetermined threshold (e.g., 96% confidence).

Figure 3:
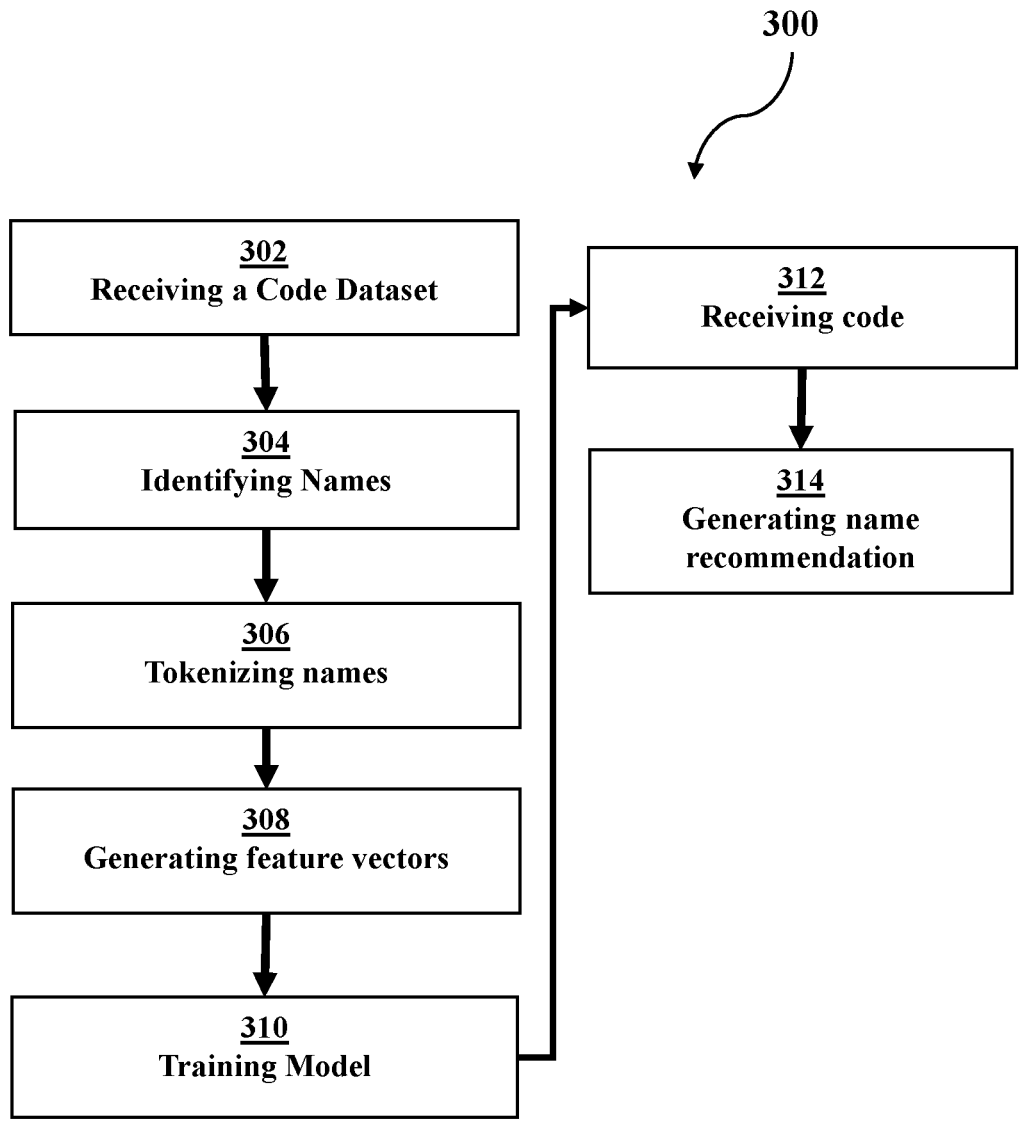
FIG. 3 is a functional block diagram method for a code factor renaming process, in accordance with an embodiment of the present invention.

FIG. 3 is a flowchart depicting a method 300 for training and utilizing a code refactor recommendation model. At step 302, receiving a source code dataset. In some embodiments, code renaming engine 104 can receive an input programming code dataset. The input can be from an integrated development environment (IDE) on a client computer, in which a plugin is installed to the IDE allowing for the transmission of the source code to the code renaming engine via network 106. For example, the source code could be the prior version or versions of a program that is being upgraded or rewritten.

At step 304, the naming convention of the source code can be determined by identifying the names of naming articles of the source code. In some embodiments, naming convention identity module 202 and analyze the source code with a language parser and determine the names of functions and classes based on a syntactic analysis of the source code. Additionally, through elimination in language parsing, naming convention identity module 202 can identify docstrings associated with naming articles.

At step 306, tokenize the names of naming articles identified by naming convention identity module 202. In some embodiments, naming convention identity module 202 can be configured with a n-gram generator to create tokens for the names of naming articles. In some embodiments, the names of identified can be tokenized by a regular expression generator.

At step 308, generate feature vectors for the code of identified naming articles and associated docstrings. The identified naming articles and associated docstrings from the source code can be fed into name recommendation module 204 to generate feature vectors. In some embodiments, the code of identified naming articles is fed into a code encoder. The code encoder can be a neural network configured to generate an n-dimensional vector for the code. The docstring associated with the code can be fed into a sentence encoder configured to generate feature vectors with the same number of dimensions as the code encoder. Further, in some embodiments, the generated feature vectors can be combined to create a single n-dimensional vector.

At step 310, train the model using the generated feature vectors and associated tokenized naming articles. The feature vectors can be mapped to the corresponding tokenized names with the name prediction model of name recommendation module 204. The generated feature vectors can be updated via regression or similar machine learning model to produce a minimized cost function that correctly predicts the tokenized name associated with the naming article and code. For example, the model may be a sequence-to-sequence model with multiple layers of neural networks, allowing for the input of code and docstrings and the output of a token for a naming article.

At step 312, receiving an input code with the same naming convention as the source code can be received at code renaming engine. A user can input the new version of a program into code renaming engine, via a user interface. In some embodiments, the IDE can be connected or code renaming engine can be embedded in an IDE allowing for the input of code.

At step 314, generate a name recommendation based on the input code. Naming convention identity module 202 can identify the names of naming articles in the input code. Code of naming articles and associated docstrings can be identified by naming convention identity module 202 and sent to name recommendation module 204. Feature vectors can be generated for the naming articles by the trained model of name recommendation module 204. Names for the naming articles can be predicted by name recommendation module 204, based on the trained model. The predicted names can be presented in a user interface to a user or automatically changed, based on configuration.

Figure 4:
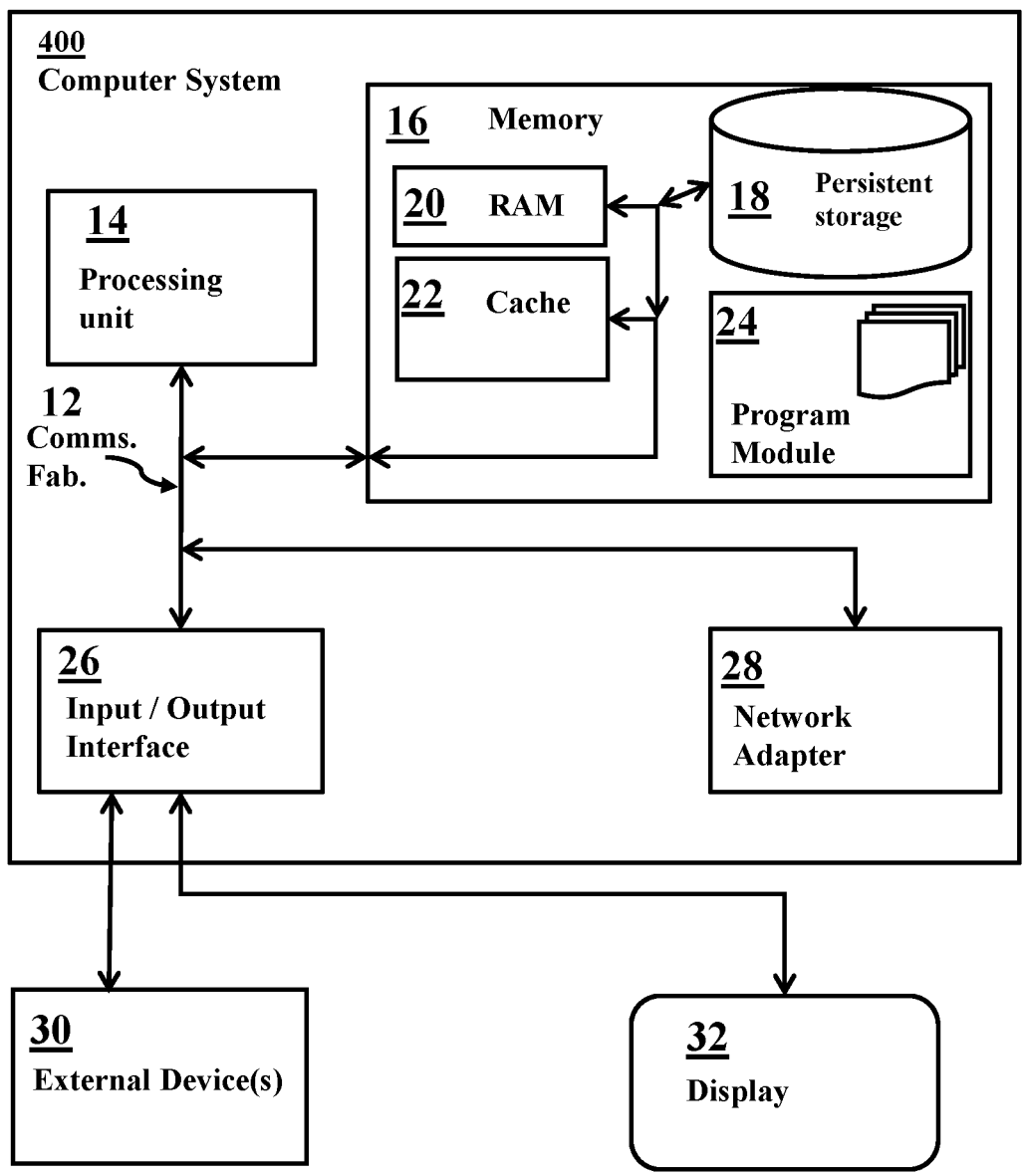
FIG. 4 is a functional block diagram of an exemplary computing system within a code refactor naming environment, in accordance with an embodiment of the present invention.

FIG. 4 depicts computer system 400, an example computer system representative of server 102 and data repository 108 or any other computing device within an embodiment of the invention. Computer system 400 includes communications fabric 12, which provides communications between computer processor(s) 14, memory 16, persistent storage 18, network adaptor 28, and input/output (I/O) interface(s) 26. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Computer system 400 includes processors 14, cache 22, memory 16, network adaptor 28, input/output (I/O) interface (s) 26 and communications fabric 12. Communications fabric 12 provides communications between cache 22, memory 16, persistent storage 18, network adaptor 28, and input/output (I/O) interface(s) 26. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses or a crossbar switch.

Memory 16 and persistent storage 18 are computer readable storage media. In this embodiment, memory 16 includes persistent storage 18, random access memory (RAM) 20, cache 22 and program module 24. In general, memory 16 can include any suitable volatile or non-volatile computer readable storage media. Cache 22 is a fast memory that enhances the performance of processors 14 by holding recently accessed data, and data near recently accessed data, from memory 16. As will be further depicted and described below, memory 16 may include at least one of program module 24 that is configured to carry out the functions of embodiments of the invention.

The program/utility, having at least one program module 24, may be stored in memory 16 by way of example, and not limiting, as well as an operating system, one or more application programs, other program modules, and program data. Each of the operating systems, one or more application programs, other program modules, and program data or some combination thereof, may include an implementation of a networking environment. Program module 24 generally carries out the functions and/or methodologies of embodiments of the invention, as described herein.

Program instructions and data used to practice embodiments of the present invention may be stored in persistent storage 18 and in memory 16 for execution by one or more of the respective processors 14 via cache 22. In an embodiment, persistent storage 18 includes a magnetic hard disk drive. Alternatively, or in addition to a magnetic hard disk drive, persistent storage 18 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Network adaptor 28, in these examples, provides for communications with other data processing systems or devices. In these examples, network adaptor 28 includes one or more network interface cards. Network adaptor 28 may provide communications through the use of either or both physical and wireless communications links. Program instructions and data used to practice embodiments of the present invention may be downloaded to persistent storage 18 through network adaptor 28.

I/O interface(s) 26 allows for input and output of data with other devices that may be connected to each computer system. For example, I/O interface 26 may provide a connection to external devices 30 such as a keyboard, keypad, a touch screen, and/or some other suitable input device. External devices 30 can also include portable computer readable storage media such as, for example, thumb drives, portable optical or magnetic disks, and memory cards. Software and data used to practice embodiments of the present invention can be stored on such portable computer readable storage media and can be loaded onto persistent storage 18 via I/O interface(s) 26. I/O interface(s) 26 also connect to display 32.

Display 32 provides a mechanism to display data to a user and may be, for example, a computer monitor or virtual graphical user interface.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality and operation of possible implementations of systems, methods, and computer program products according to various embodiments of the present invention. In this regard, each block in the flowchart or block diagrams may represent a module, segment or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
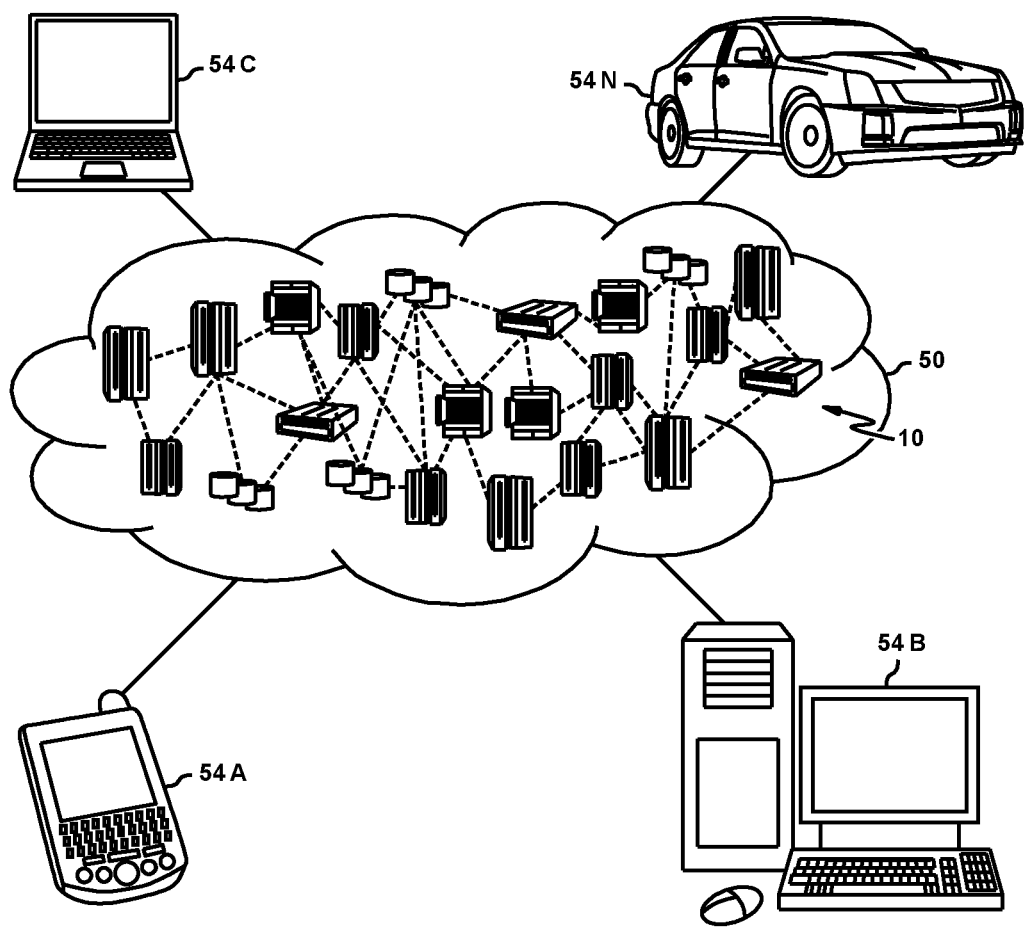
FIG. 5 is a diagram depicting a cloud computing environment, in accordance with an embodiment of the present invention.

FIG. 5 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 6:
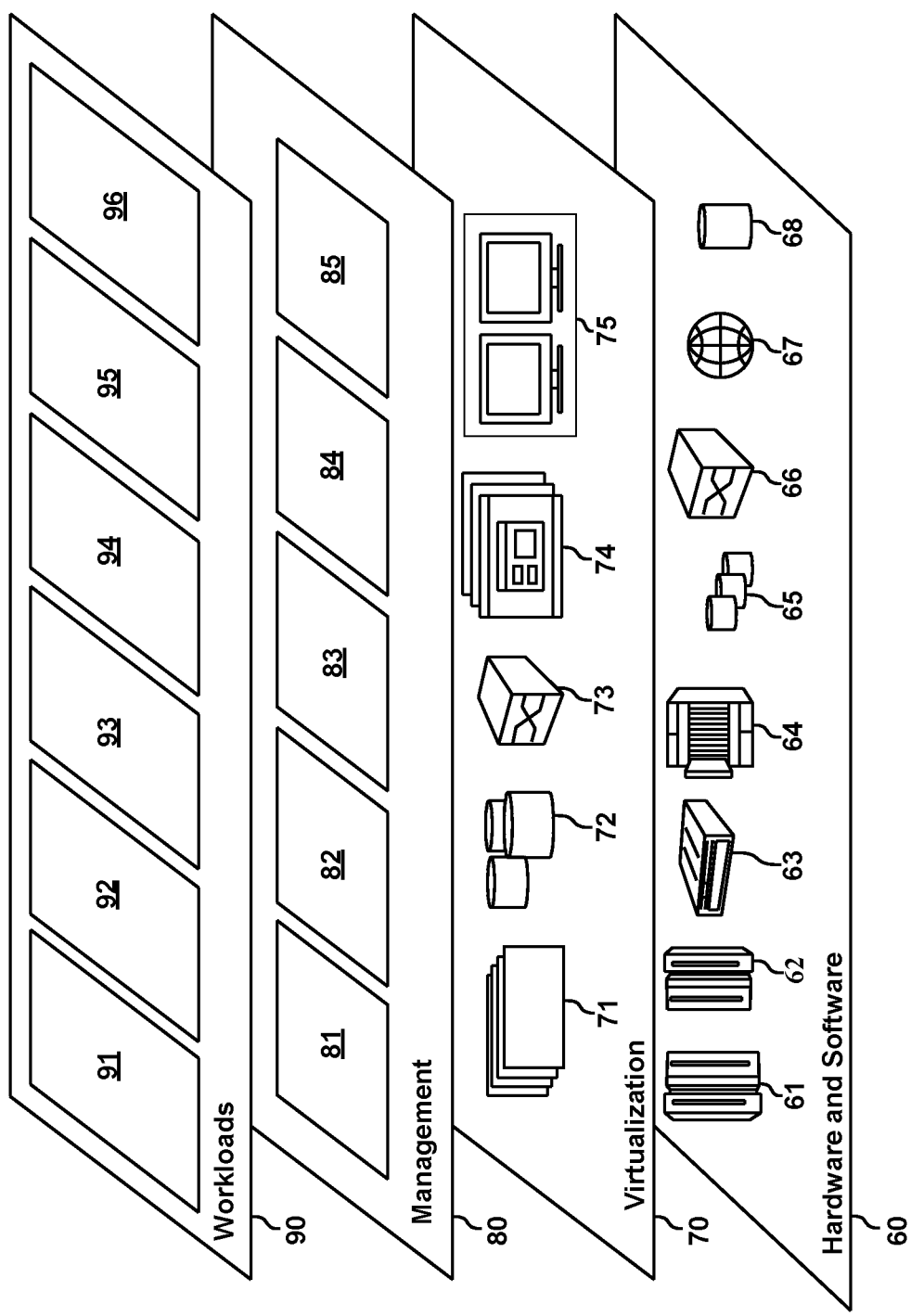
FIG. 6 is a functional block diagram depicting abstraction model layers, in accordance with an embodiment of the present invention.

FIG. 6 is a block diagram depicting a set of functional abstraction model layers provided by cloud computing environment 50 depicted in FIG. 5 in accordance with at least one embodiment of the present invention. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and code refactor renaming 96.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for code refactor renaming, the method comprising:
   receiving, by one or more processors, a source code dataset, wherein the dataset is comprised of a plurality of functions and a plurality of classes;
   identifying, by the one or more processors, function names and class names from the plurality of functions and the plurality of classes of the source code dataset;
   tokenizing, by the one or more processors, each of the identified function names and identified class names;
   generating, by the one or more processors, feature vectors for the source code of the plurality of functions and the plurality of classes;
   generating, by the one or more processors, feature vectors for the docstrings associated with the plurality of functions and the plurality of classes;
   combining, by the one or more processors, each feature vector of the docstrings with the corresponding feature vector of the source code in the at least one of the functions and the class;
   training, by the one or more processors, a machine learning model through regression to map the combined feature vectors to the corresponding tokenized function names;
   receiving, by the one or more processors, a programming code with the same naming convention as the determined naming convention at the trained machine learning model;
   generating, by the one or more processors, a name recommendation for one or more functions with the trained machine learning model;
   generating, by the one or more processors, a confidence score for the name recommendation, and
   responsive to the confidence score being above a predetermined threshold, automatically renaming, by the one or more processors, the one or more functions with the name recommendation.

2. The computer-implemented method of claim 1, wherein identifying function names and class names is based on an abstract syntax tree.

3. The computer-implemented method of claim 1, wherein tokenizing function names and class names is performed by an n-gram generator model.

4. The computer-implemented method of claim 1, wherein the machine learning model is a sequence to sequence model.

5. The computer-implemented method of claim 1, wherein generating feature vectors for the source code of the plurality of functions and the plurality of classes is performed by a code encoder.

6. The computer-implemented method of claim 1, generating feature vectors for the docstrings associated with the plurality of functions and the plurality of classes is performed by a sentence encoder.

7. The computer-implemented method of claim 1, wherein combining each feature vector of the docstrings with the corresponding feature vector of the source code in the at least one of the functions and the class is taking the average of the corresponding feature vector.

8. A system for code refactor renaming, the system comprising:
   one or more computer processors;
   one or more computer readable storage media; and
   computer program instructions to:
      receive a source code dataset, wherein the dataset is comprised of a plurality of functions and a plurality of classes;
      identify function names and class names from the plurality of functions and the plurality of classes of the source code dataset;
      tokenize each of the identified function and identified class names;
      generate feature vectors for the source code of the plurality of functions and the plurality of classes;
      generate feature vectors for the docstrings associated with the plurality of functions and the plurality of classes;
      combine each feature vector of the docstrings with the corresponding feature vector of the source code in the at least one of the functions and the class;
      train a machine learning model through regression to map the combined feature vectors to the corresponding tokenized function names;
      receiving, by the one or more processors, a programming code with the same naming convention as the determined naming convention at the trained machine learning model; and
      generate a name recommendation for one or more functions with the trained machine learning model;
      calculate a confidence score for the name recommendation, and
      responsive to the confidence score being above a predetermined threshold, instructions to automatically rename the one or more functions with the name recommendation.

9. The system of claim 8, wherein identifying function names and class names is based on an abstract syntax tree.

10. The system of claim 8, wherein tokenizing function names and class names is performed by an n-gram generator model.

11. The system of claim 8, wherein the machine learning model is a sequence to sequence model.

12. The system of claim 8, wherein generating feature vectors for the source code of the plurality of functions and the plurality of classes is performed by a code encoder.

13. The system of claim 8, wherein generating feature vectors for the docstrings associated with the plurality of functions and the plurality of classes is performed by a sentence encoder.

14. The system of claim 8, wherein combining each feature vector of the docstrings with the corresponding feature vector of the source code in the at least one of the functions and the class is taking the average of the corresponding feature vector.

15. A computer program product for code refactor renaming comprising a computer readable storage medium having program instructions embodied therewith, the program instructions executable by a processor to cause the processors to perform a function, the function comprising:
   receive a source code dataset, wherein the dataset is comprised of a plurality of functions and a plurality of classes;
   identify function names and class names from the plurality of functions and the plurality of classes of the source code dataset;
   tokenize each of the identified function and class names;
   generate feature vectors for the source code of the plurality of functions and the plurality of classes;
   generate feature vectors for the docstrings associated with the plurality of functions and the plurality of classes;
   combine each feature vector of the docstrings with the corresponding feature vector of the source code in the at least one of the functions and the class;
   train a machine learning model through regression to map the combined feature vectors to the corresponding tokenized function names;
   receiving, by the one or more processors, a programming code with the same naming convention as the determined naming convention at the trained machine learning model; and
   generate a name recommendation for one or more functions with the trained machine learning model;
   calculate a confidence score for the name recommendation, and
   responsive to the confidence score being above a predetermined threshold, instructions to automatically rename the one or more functions with the name recommendation.

16. The computer program product of claim 15, wherein identifying function names and class names is based on an abstract syntax tree.

17. The computer program product of claim 15, wherein tokenizing function names and class names is performed by an n-gram generator model.

18. The computer program product of claim 15, wherein the machine learning model is a sequence-to-sequence model.

19. The computer program product of claim 15, wherein generating feature vectors for the source code of the plurality of functions and the plurality of classes is performed by a code encoder.

20. The computer program product of claim 15, wherein generating feature vectors for the docstrings associated with the plurality of functions and the plurality of classes is performed by a sentence encoder.

* * * * *